US011292496B2

(12) United States Patent
Okyere et al.

(10) Patent No.: US 11,292,496 B2
(45) Date of Patent: Apr. 5, 2022

(54) METHOD FOR POWER SUPPLY AND POWER SUPPLY FOR RAILWAY OPERATING ELEMENTS ARRANGED ON A RAILWAY LINE

(71) Applicant: SIEMENS MOBILITY GMBH, Munich (DE)

(72) Inventors: Philip Fosu Okyere, Braunschweig (DE); Matthias Seifert, Braunschweig (DE)

(73) Assignee: Siemens Mobility GmbH, Munich (DE)

( * ) Notice: Subject to any disclaimer, the term of this patent is extended or adjusted under 35 U.S.C. 154(b) by 551 days.

(21) Appl. No.: 16/317,055

(22) PCT Filed: Jul. 24, 2017

(86) PCT No.: PCT/EP2017/068632
§ 371 (c)(1),
(2) Date: Jan. 11, 2019

(87) PCT Pub. No.: WO2018/019763
PCT Pub. Date: Feb. 1, 2018

(65) Prior Publication Data
US 2019/0291756 A1 Sep. 26, 2019

(30) Foreign Application Priority Data

Jul. 29, 2016 (DE) .......................... 102016214051.5

(51) Int. Cl.
*B60M 3/02* (2006.01)
*B61L 7/08* (2006.01)
(Continued)

(52) U.S. Cl.
CPC ................ *B61L 7/08* (2013.01); *B60M 3/02* (2013.01); *B61L 23/00* (2013.01);
(Continued)

(58) Field of Classification Search
CPC .. B60M 3/02; B61L 7/08; B61L 23/00; B61L 27/0005; H02J 1/00; H02J 3/04; H02J 3/38
See application file for complete search history.

(56) References Cited

U.S. PATENT DOCUMENTS 5,760,492 A   6/1998  Kanoi et al.
7,372,374 B2  5/2008  Gehrke et al.
(Continued)

FOREIGN PATENT DOCUMENTS

CN   101448672 A    6/2009
CN   102231564 A   11/2011
(Continued)

OTHER PUBLICATIONS

Gonzalez D. at al.: "Optimal Design of a D.C. Railway Power Supply System", 2008 IEEE Electrical Power & Energy Conference, Dec. 31, 2008, pp. 1-6.
(Continued)

*Primary Examiner* — Levi Gannon
(74) *Attorney, Agent, or Firm* — Laurence A. Greenberg; Werner H. Stemer; Ralph E. Locher

(57) ABSTRACT

A method for supplying power to railway operating elements that are arranged along a railway line. A terminal station has a power supply device. At least one substation has a power supply subunit for at least one connected railway operating element. An input-side control unit of the substation modifies the current consumption in the substation incrementally, with corresponding modification of the voltage of the power supply subunit to match the rated voltage of the railway operating element on the substation, and producing a coded message. The control device of the terminal station modifies the output voltage according to the coded message, until the rated voltage for the railway operating element is reached on the power supply subunit. When the nominal voltage is
(Continued)

reached the power supply subunit is connected to the railway operating element.

14 Claims, 2 Drawing Sheets

(51) Int. Cl.
    *B61L 23/00*     (2006.01)
    *H02J 3/38*     (2006.01)
    *B61L 27/00*     (2022.01)
    *H02J 3/04*     (2006.01)
    *H02J 1/00*     (2006.01)

(52) U.S. Cl.
    CPC ............ *B61L 27/0005* (2013.01); *H02J 1/00* (2013.01); *H02J 3/04* (2013.01); *H02J 3/38* (2013.01)

(56) References Cited

U.S. PATENT DOCUMENTS

| | | |
|---|---|---|
| 9,088,177 B2 | 7/2015 | Bauer et al. |
| 2006/0164049 A1 | 7/2006 | Duerbaum |
| 2009/0195076 A1 | 8/2009 | Glaubitz et al. |
| 2011/0043038 A1* | 2/2011 | Tsutsumi .......... H01M 10/6567 307/48 |
| 2011/0284697 A1 | 11/2011 | Altamura et al. |
| 2015/0027838 A1* | 1/2015 | Ueda ........................ B60M 3/02 191/6 |
| 2015/0045997 A1* | 2/2015 | Nogi ......................... B60L 9/08 701/19 |
| 2019/0016356 A1* | 1/2019 | Mochimaru .............. B60L 9/00 |
| 2021/0086803 A1* | 3/2021 | Mochimaru .............. B60M 3/06 |

FOREIGN PATENT DOCUMENTS

| | | |
|---|---|---|
| CN | 102306931 A | 1/2012 |
| CN | 204641431 U | 9/2015 |
| CN | 104986058 A | 10/2015 |
| CN | 204978290 U | 1/2016 |
| DE | 29609453 U1 | 8/1996 |
| DE | 102008055811 A1 | 5/2010 |
| DE | 102015200128 A1 | 7/2016 |
| EP | 1329786 A1 | 7/2003 |
| JP | H07322499 A | 12/1995 |
| WO | 2012076313 A1 | 6/2012 |

OTHER PUBLICATIONS

Yuan Yong et al.: "The Role and Effect of Series Capacitor Compensator Installed in Section Post for Double-line Railway", High Speed Railway Technology, vol. 2, No. 5, Apr. 30, 2014, pp. 24-27—English abstract.

* cited by examiner

METHOD FOR POWER SUPPLY AND POWER SUPPLY FOR RAILWAY OPERATING ELEMENTS ARRANGED ON A RAILWAY LINE

BACKGROUND OF THE INVENTION

Field of the Invention

It is well-known to arrange railway operating elements along a railway line for the purpose of controlling railway operation, said railway operating elements generally being actuators or sensors. In order to supply the railway operating elements with power from an electrical power source, the railway line may in this case easily be several kilometers long, with the result that it is also necessary to supply the railway operating elements with energy over this distance. Depending on the length of the railway line, the conductor cross-section used for the power supply and other conductor characteristics, as well as on the respective power requirements of the railway operating elements, there is a greater or lesser voltage drop along the energy transmission section containing the railway operating elements. Very complex and comprehensive measures must therefore be taken to ensure an adequate voltage is available at the respective deployment location of the railway operating elements, which requires in particular a precise project planning and configuration process.

Each of the railway operating elements must not only be individually supplied with operating energy, but must also ensure a reliable exchange of information. In a new generation of railway operating elements, use is made of intelligent railway operating elements in which energy and information exchange are managed separately. In this case the information associated with the railway operating elements is subject to stringent safety requirements, although the information is not available until after an adequate input voltage is applied. The power supply is monitored at best by a diagnostic system lacking particular safety characteristics. In order to have the correct information at their disposal, microprocessor-based diagnostic systems used require a defined supply voltage, though said voltage is not yet present at the time the railway operating elements are activated. It may also happen in the event of a fault that a status message issued by a diagnostic system, if present, may possibly no longer be received in time due to an absence or failure of the energy supply, e.g. as a result of a line break or if there is a reduction in the voltage due to an insulation defect. Other fault sources which make a diagnosis impossible even when the correct supply voltage is present are also conceivable.

In the prior art, the power supply for railway operating elements arranged along a railway line is planned, dimensioned, fine-tuned if necessary, and inspected by an expert in a comprehensive project planning and configuration process in the course of the installation. For that purpose, use is made of switched-mode power supplies having what are termed wide-range inputs that tolerate certain voltage fluctuations at the input. An interruption to the power supply can also be compensated for by means of local energy stores.

SUMMARY OF THE INVENTION

The object underlying the invention is to propose a method for supplying power to railway operating elements arranged on a railway line which can be implemented in a time-saving and cost-effective manner.

In order to achieve this object, in the method according to the invention for supplying power to railway operating elements arranged on a railway line, with a terminal station provided with a power supply device and with at least one substation that is connected to the terminal station and has a power supply subunit for at least one respective connected railway operating element, the current consumption in the substation is modified by means of an input-side control unit of the substation, said modification being defined in increments, with corresponding modification of the voltage of the power supply subunit to match the rated voltage of the railway operating element at the substation, with simultaneous generation of a coded message, wherein a control device of the terminal station, in response to the coded message, modifies its output voltage accordingly while attaining the rated voltage for the railway operating element at the power supply subunit, and the power supply subunit is connected to the railway operating element when the rated voltage is reached.

An essential advantage of the method according to the invention is that it provides a power supply for railway operating elements arranged on a railway line that is self-actuating in the manner of a feedback control system, thereby enabling a reduction in complex project planning and configuration processes. By means of the method according to the invention it is therefore possible to introduce a power supply for railway operating elements arranged on a railway line in a time-saving and cost-effective manner.

The method according to the invention is not only suitable for supplying operating energy to railway operating elements having a single substation connected in series with the terminal station, but advantageously is also suitable for supplying further substations, in that a control arrangement having a downstream further power supply subunit of a further substation is connected to a further control unit of the one substation, which further control unit can be connected to the control unit, and the current consumption in the further substation is modified by means of the control arrangement of the further substation, said modification being defined in increments, with corresponding modification of the output voltage of the control device of the terminal station and of the voltage at the power supply subunit to match the rated voltage of the railway operating element of the further substation, with simultaneous generation of a coded message, wherein the further power supply subunit is connected to the railway operating element when the rated voltage is reached.

In this case there is of course no restriction to the use of one further substation, but rather a plurality of substations may be provided along a railway line, this obviously being dependent on the voltage that is provided in total at the terminal station in order to distribute said voltage to the various substations.

The control unit and also the control arrangement of the substation and of further substations may be implemented in different ways; it is deemed advantageous if switchable power-consuming loads are used in the control unit and in the control arrangement in order to modify the voltage in defined increments and in order to generate the coded messages.

It has furthermore proved advantageous if the coded messages formed during the execution of the method according to the invention are monitored in the terminal station.

With the monitoring of the coded messages in the terminal station, there is advantageously brought about the further possibility of signaling a line break if a coded message fails to arrive, which line break can then, where applicable, be detected in an associated interlocking.

It is furthermore advantageous in the method according to the invention that an insulation defect is signaled if an expected voltage increase fails to occur.

An error message may advantageously also be generated by means of the method according to the invention if the rated voltage of the respective railway operating element is exceeded in the substation and the rated voltage of the respective railway operating element cannot be reached in the last substation.

The invention further relates to a power supply for railway operating elements arranged on a railway line and sets itself the object of implementing such a power supply in a functionally reliable manner.

This object is achieved according to the invention by means of a power supply for railway operating elements arranged on a railway line, with a terminal station provided with a power supply unit and with at least one substation that is connected to the terminal station and has a power supply subunit for at least one respective connected railway operating element, in which an input-side control unit of the substation modifies the current consumption in the substation, said modification being defined in increments, with corresponding modification of the voltage of the power supply subunit to match the rated voltage of the railway operating element of the substation, with simultaneous generation of a coded message; in this case a control device of the terminal station, in response to the coded message, modifies its output voltage accordingly while attaining the rated voltage for the railway operating element of the further power supply subunit, and the power supply subunit is connected to the railway operating element when the rated voltage is reached.

A functionally reliable power supply for the further railway operating element can be realized by means of such an embodiment of the power supply device according to the invention.

In the power supply according to the invention, the embodiment is not limited to a terminal station having a single substation, but rather a further power supply subunit of a further substation is advantageously connected to the power supply subunit on the output side and the current consumption in the further substation is modified by means of a control arrangement of the further substation, said modification being defined in increments, with corresponding modification of the output voltage of the control device of the terminal station and of the voltage at the power supply subunit to match the rated voltage of the railway operating element of the further substation, with simultaneous generation of a coded message; in this case the further power supply subunit is connected to the railway operating element when the rated voltage is reached.

There is by no means a restriction to the use of a single further substation only, but rather a plurality of substations may be provided along a railway line, this of course being dependent on the voltage that is provided in total at the terminal station in order then to distribute said voltage to the various substations.

With the power supply according to the invention it is furthermore advantageous if the control device, the control unit and the control arrangement have switchable power-consuming loads for modifying the voltage in increments and for generating the coded messages.

BRIEF DESCRIPTION OF THE SEVERAL VIEWS OF THE DRAWING

With the aim of providing further explanation of the invention.

DESCRIPTION OF THE INVENTION

Figure 1:
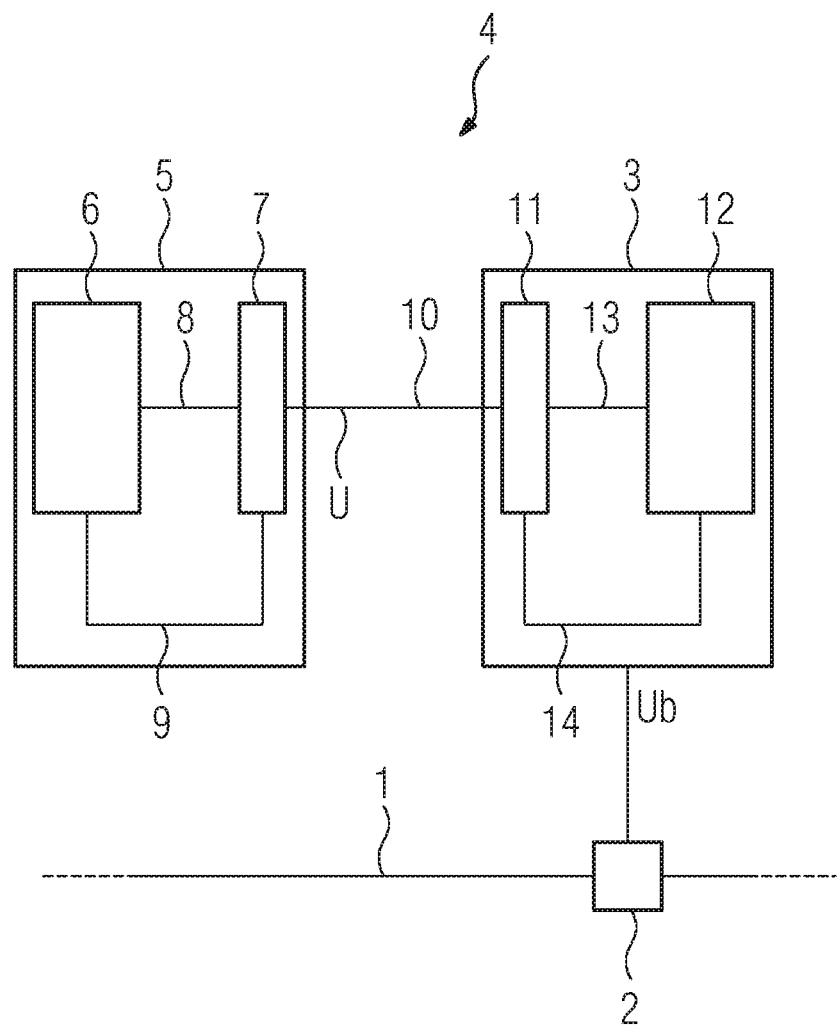
FIG. 1 shows an exemplary embodiment of a power supply comprising a terminal station and a substation.

As can be seen in FIG. 1, railway operating elements 2, which may be actuators or sensors, are arranged along a railway line 1. The railway operating elements 2 are connected to a substation 3 in a power supply 4 which ensures the power supply for the operating elements 2 in a manner described in more detail hereinbelow. The substation 3 is connected in series with a terminal station 5, which is equipped with a power supply device 6 and a control device 7.

The power supply device 6 is connected to the control device 7 via an electrical connection 8. In addition, a further connecting line 9, via which the control device 7 acts on the power supply device 6, runs between the power supply device 6 and the control device 7.

The terminal station 5 is connected via an electrical connection 10 to the substation 3, and more specifically to a control unit 11. The substation 3 comprises a power supply subunit 12 which is connected via one connecting line 13 to the output of the control unit 11 and via a further connecting line 14 to a control output of said control unit 11.

The illustrated power supply operates in the following manner: if, at the time of activation, a voltage U is generated by the control device 7 of the terminal station 5, which voltage U is significantly less than a rated voltage of the railway operating elements 2 at the substation 3, the substation 3 can enlist the aid of the control unit 11 in order to request the control device 7 of the terminal station 5 to increase the voltage U at the output of the terminal station 5 by a further increment based on a defined activatable and deactivatable current range, which is realized for example by means of small switchable additional power-consuming loads in the control unit 11. A specific message can be coded during this process by a targeted activation/deactivation of one or more power-consuming loads in the control unit 11. If a required operating voltage Ub at the output of the power supply subunit 12 has not yet been reached, the voltage U at the terminal station 5 is increased once again. The terminal station 5 waits for the status message of the substation 3, interprets said message after its arrival, and initiates the corresponding measure to increase or reduce the voltage. If the desired voltage Ub is equal to the rated voltage of the power supply subunit 12, this is signaled and the power supply subunit is connected. If the energy requirement brought about thereby in turn results in a specific voltage threshold being undershot, a further request is made for an increase in the voltage U at the terminal station 5. If the voltage here lies within a defined range, an "OK" is signaled. If the voltage Ub at the substation 3 exceeds a specific threshold value, this can be signaled in the same way to the terminal station 5, which in response can then initiate the necessary measures to produce a voltage reduction. This situation can occur when a heavy power-consuming load that causes a high voltage drop along the energy supply line is switched off.

The coded messages are monitored in the terminal station 5. If it turns out that a coded message fails to arrive, this is signaled as a line break. If an expected voltage increase does not occur, it is deduced from this that an insulation defect has occurred. A feedback control system is therefore realized in the case of the power supply.

Figure 2:
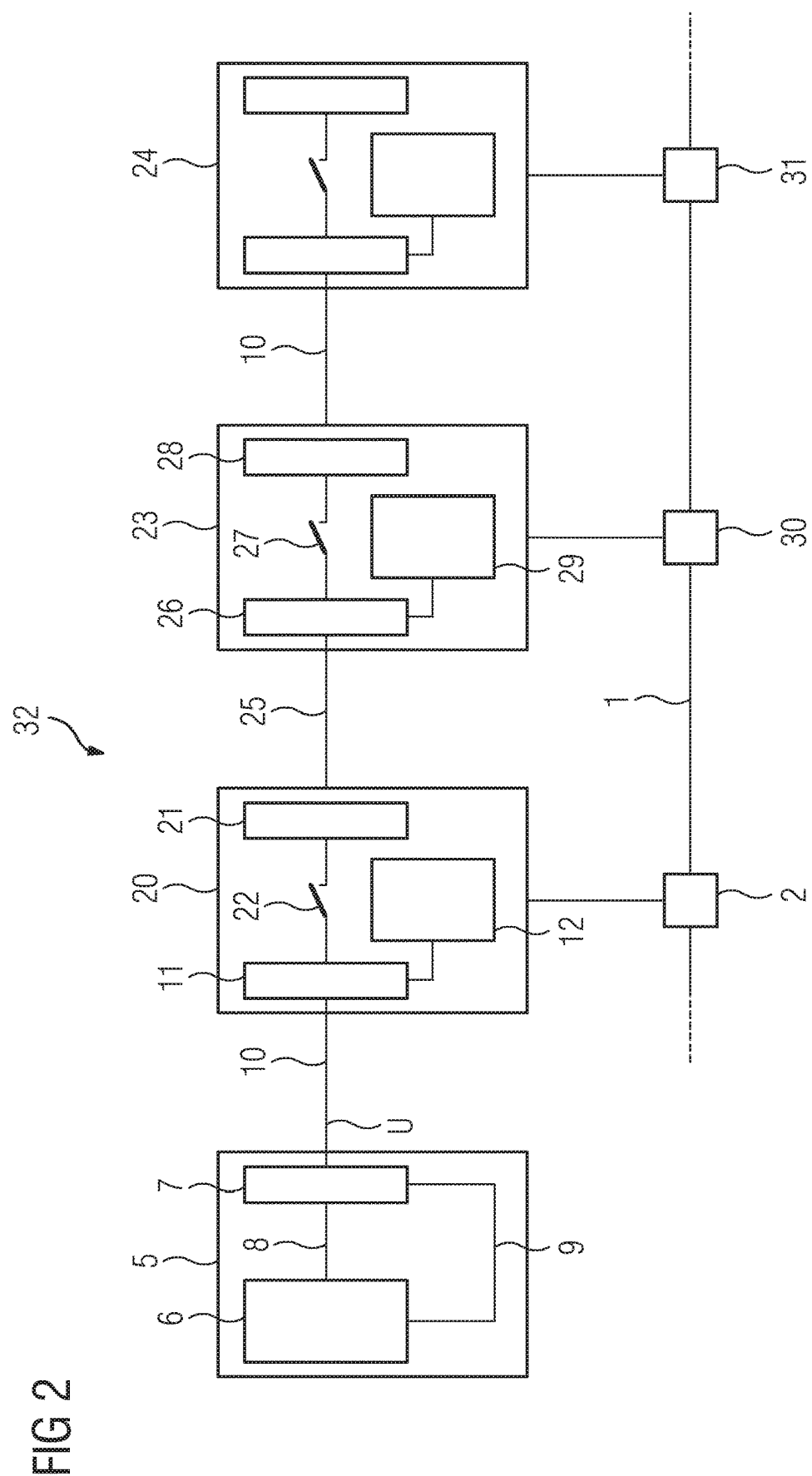
FIG. 2 shows an exemplary embodiment of the power supply according to the invention comprising a terminal station and three substations.

In the exemplary embodiment according to FIG. 2, the elements corresponding to those according to FIG. 1 are labeled with the same reference characters. It can be seen that a further substation 23 and an additional substation 24 are connected in series with the terminal station 5 and the one substation 20 in this exemplary embodiment. It can also be seen that, in contrast to the exemplary embodiment according to FIG. 1, a control structure 21 is provided in the substation 20, which control structure 21 is connected via a switch 22 to the one control unit 11 on one side and via an electrical connection 25 to a control arrangement 26 of the further substation 23 on the other. A further control structure 28, which corresponds to the control structure 21, and a further power supply subunit 29 are connected via a switch 27 to the control arrangement 26.

The additional substation 24 is configured in an identical manner to the one substation 20 and the further substation 23.

All substations 20, 23 and 24 are arranged along the railway line 1 via respective operating elements 2, 30 and 31 in order to ensure safe railway operation by means of actuators or sensors in this example also.

In this configuration of the power supply 32 according to FIG. 2, the one substation 20 is placed into operation first—as already described above—and thereafter the further substation 23 and, where applicable, the additional substation 24 are brought into service. In the process, in the further substation 23, the control arrangement 26 is used as a means of inducing the control device 7 of the terminal station 5, via the control structure 21, to modify the voltage U at the output of the terminal station 5 in increments by means of switchable additional power-consuming loads. The one substation 20 is subsequently checked once again and correctively adjusted if necessary. The further substation 23 is then connected and the two substations 20 and 23 are correctively adjusted if necessary.

If it comes to a situation in which the necessary voltage has not yet been reached at the further substation 23, even though the rated voltage has already been exceeded at the one substation 20, the operation is aborted with an error message at the terminal station 5 or, under certain circumstances, only a reduced number of substations are put into operation.

LIST OF REFERENCE CHARACTERS

1 Railway line
2, 30, 31 Railway operating elements, operating elements
3 Substation
4, 32 Power supply
5 Terminal station
6 Power supply device
7 Control device
8 Electrical connection
9 Electrical connection
10 Electrical connection
11 Control unit
12 Power supply subunit
13 Connecting line
14 Connecting line
20 Substation
21 Control structure
22 Switch
23 Further substation
24 Additional substation
25 Electrical connection
26 Control arrangement
25 Power supply subunit
27 Switch
28 Further control structure
29 Further power supply subunit
U Voltage
Ub Operating voltage

The invention claimed is:

1. A method for supplying power to railway operating elements arranged along a railway line, wherein a terminal station with a power supply device and a control device is connected to at least one substation and the at least one substation includes an input-side control unit and a power supply subunit for supplying at least one railway operating element connected thereto, the method comprising:
    modifying a current consumption in the substation by the input-side control unit of the substation in increments, and correspondingly modifying a voltage of the power supply subunit to match a rated voltage of the railway operating element at the substation, and simultaneously generating a coded message;
    in response to receiving the coded message, modifying with the control device of the terminal station an output voltage of the terminal station to attain the rated voltage for the railway operating element at the power supply subunit; and
    in response to detecting that the rated voltage is reached, electrically connecting the power supply subunit to the railway operating element.

2. The method according to claim 1, wherein a further substation with a further control arrangement and a further power supply subunit is connected downstream of a second control unit of the substation, and wherein said second control unit can be connected to the control unit, and the method comprises:
    modifying a current consumption in the further substation by way of the control arrangement of the further substation in increments, with a corresponding modification of the output voltage of the control device of the terminal station and of the voltage at the power supply subunit to match a rated voltage of a railway operating element assigned to the further substation, and simultaneously generating a coded message; and
    connecting the further power supply subunit to the railway operating element when the rated voltage is reached.

3. The method according to claim 2, which comprises modifying the voltage in defined increments and generating the coded messages by using switchable power-consuming loads in the control unit and in the control arrangement.

4. The method according to claim 1, which comprises monitoring the coded messages in the terminal station.

5. The method according to claim 1, which comprises signaling a line break if a coded message fails to arrive.

6. The method according to claim 1, which comprises signaling an insulation defect if an expected voltage increase fails to occur.

7. The method according to claim 1, which comprises generating an error message if the rated voltage of the respective operating element is exceeded in the substation and the rated voltage of the respective operating element cannot be reached in a last substation of a series of substations connected to the terminal station.

8. The method according to claim 1, wherein the coded message is generated by the substation.

9. The method according to claim 1, which comprises modifying the voltage in defined increments and generating the coded messages by using switchable power-consuming loads in the control unit and in the control arrangement.

10. A power supply system for railway operating elements arranged along a railway line, the power supply system comprising:
   a terminal station having a power supply device and a control device;
   at least one substation connected to said terminal station, said at least one substation having a power supply subunit for at least one respective connected railway operating element;
   said at least one substation having an input-side control unit configured to effect a modification of a current consumption in the substation, the modification being defined in increments, with corresponding modification of a voltage of a power supply subunit to match a rated voltage of the railway operating element of the substation, and with a simultaneous generation of a coded message;
   said control device of said terminal station being configured, in response to the coded message, to modify an output voltage of said terminal station accordingly while attaining the rated voltage for the railway operating element at said power supply subunit, wherein said power supply subunit is connected to the railway operating element in response to detecting that the rated voltage is reached.

11. The power supply system according to claim 10, wherein said at least one substation is a first substation, said power supply subunit is a first power supply subunit, said input-side control unit is a first control unit, and said first substation includes a second control unit connectable to said first control unit, and the power supply system further comprising:
   a further substation having a control arrangement and a downstream further power supply subunit connected to said second control unit of said first substation;
   said control arrangement of said further substation being configured to modify a current consumption in said further substation in increments, with a corresponding modification of the output voltage of said control device of said terminal station and of a voltage at said power supply subunit to match a rated voltage of the railway operating element of said further substation, and a with simultaneous generation of a coded message; and
   wherein said further power supply subunit connects itself to the railway operating element when the rated voltage is reached.

12. The power supply according to claim 11, wherein said first control unit and said control arrangement comprise switchable power-consuming loads in order to modify the voltage in increments and in order to generate the coded messages.

13. The power supply according to claim 10, wherein the coded message is generated by the substation.

14. The power supply according to claim 10, wherein said first control unit and said control arrangement comprise switchable power-consuming loads in order to modify the voltage in increments and in order to generate the coded messages.

* * * * *